(12) United States Patent
Slater et al.

(10) Patent No.: US 9,665,434 B2
(45) Date of Patent: May 30, 2017

(54) COMMUNICATING CHUNKS BETWEEN DEVICES

(75) Inventors: Alastair Slater, Chepslow Monmouthshire (GB); Simon Pelly, Bristol (GB); Peter Thomas Camble, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 860 days.

(21) Appl. No.: 13/367,567

(22) Filed: Feb. 7, 2012

(65) Prior Publication Data

US 2012/0137097 A1 May 31, 2012

Related U.S. Application Data

(62) Division of application No. 12/239,263, filed on Sep. 26, 2008, now Pat. No. 8,140,637.

(60) Provisional application No. 61/000,427, filed on Oct. 25, 2007.

(51) Int. Cl.
*G06F 11/14* (2006.01)
(52) U.S. Cl.
CPC ...... *G06F 11/1451* (2013.01); *G06F 11/1461* (2013.01); *G06F 11/1464* (2013.01)
(58) Field of Classification Search
USPC ......................................................... 711/154
See application file for complete search history.

(56) References Cited

U.S. PATENT DOCUMENTS

| 5,369,778 A | 11/1994 | San Soucie et al. |
| 5,638,509 A | 6/1997 | Dunphy |
| 5,990,810 A | 11/1999 | Williams |
| 6,003,114 A | 12/1999 | Bachmat |
| 6,122,626 A | 9/2000 | Brandsma |

(Continued)

FOREIGN PATENT DOCUMENTS

| CN | 1692356 | 11/2005 |
| EP | 2012235 | 1/2009 |

(Continued)

OTHER PUBLICATIONS

Andrejko et al.: User Characteristics Acquisition from Logs with Semantics, Slovak University of Technology in Bratislava, 2007 (8 pages).

(Continued)

*Primary Examiner* — Michael Alsip
(74) *Attorney, Agent, or Firm* — Trop, Pruner & Hu, P.C.

(57) ABSTRACT

An apparatus, for connection to a storage device, comprising: a module for communication with a software application and operable to receive instructions to copy data to the storage device; a chunking and identifier generation module operable to receive the data, to process the data into one or more chunks, to generate a first chunk identifier, representative of the identity of a first of the or each chunk of data and, upon processing of the data, to initiate the issuance of a confirmation signal to the software application indicating that the data has been copied to the storage device; and an interface for communication with the storage device, wherein the interface is operable to send the first chunk identifier to the storage device, and to send the first chunk of data to the storage device upon receipt of a transfer instruction from the storage device.

14 Claims, 14 Drawing Sheets

(56) References Cited

U.S. PATENT DOCUMENTS

| | | |
|---|---|---|
| 6,396,838 B1 | 5/2002 | Palnati |
| 6,513,050 B1 | 1/2003 | Williams |
| 6,542,975 B1 | 4/2003 | Evers et al. |
| 6,564,228 B1 | 5/2003 | O'Connor |
| 6,785,768 B2 | 8/2004 | Peters et al. |
| 6,795,963 B1 | 9/2004 | Andersen et al. |
| 6,839,680 B1 | 1/2005 | Liu |
| 6,928,526 B1 | 8/2005 | Zhu et al. |
| 6,938,005 B2 | 8/2005 | Iverson et al. |
| 6,961,009 B2 | 11/2005 | McCanne |
| 7,028,158 B1 | 4/2006 | Beatty et al. |
| 7,065,619 B1 | 6/2006 | Zhu et al. |
| 7,082,548 B2 | 7/2006 | Nakano |
| 7,269,689 B2 | 9/2007 | Eshghi |
| 7,472,242 B1 | 12/2008 | Deshmukh et al. |
| 7,577,817 B2 | 8/2009 | Karpoff et al. |
| 7,584,338 B1 | 9/2009 | Bricker et al. |
| 7,593,973 B2 | 9/2009 | Lee |
| 7,636,827 B2 | 12/2009 | Asano et al. |
| 7,660,836 B2 * | 2/2010 | Bolik et al. ............ 707/640 |
| 7,733,247 B1 | 6/2010 | He et al. |
| 7,761,680 B2 * | 7/2010 | Ash et al. .............. 711/165 |
| 7,788,233 B1 | 8/2010 | Iyer et al. |
| 7,913,056 B2 | 3/2011 | Brown et al. |
| 7,917,722 B2 | 3/2011 | Yamamoto et al. |
| 7,925,683 B2 | 4/2011 | Jain et al. |
| 7,954,104 B2 * | 5/2011 | Amaki et al. ............ 718/103 |
| 7,979,670 B2 | 7/2011 | Saliba et al. |
| 8,099,573 B2 | 1/2012 | Camble et al. |
| 8,140,637 B2 | 3/2012 | Slater et al. |
| 8,150,851 B2 | 4/2012 | Jones |
| 8,156,306 B1 | 4/2012 | Raizen et al. |
| 8,161,255 B2 | 4/2012 | Anglin et al. |
| 8,214,517 B2 * | 7/2012 | Dubnicki et al. ............ 709/231 |
| 8,332,404 B2 | 12/2012 | Camble et al. |
| 8,499,131 B2 | 7/2013 | Lillibridge et al. |
| 8,543,782 B2 | 9/2013 | Fineberg et al. |
| 8,660,994 B2 | 2/2014 | Slater et al. |
| 8,782,368 B2 | 7/2014 | Lillibridge et al. |
| 8,959,089 B2 | 2/2015 | Lillibridge et al. |
| 9,141,621 B2 | 9/2015 | Lillibridge et al. |
| 2001/0001870 A1 | 5/2001 | Ofek et al. |
| 2001/0010070 A1 | 7/2001 | Crockett |
| 2001/0011266 A1 | 8/2001 | Baba |
| 2002/0133491 A1 | 9/2002 | Sim et al. |
| 2002/0156901 A1 | 10/2002 | Erickson et al. |
| 2002/0156912 A1 | 10/2002 | Hurst et al. |
| 2002/0164956 A1 | 11/2002 | Maltz et al. |
| 2002/0169934 A1 | 11/2002 | Krapp |
| 2002/0177910 A1 | 11/2002 | Quarterman et al. |
| 2003/0065898 A1 | 4/2003 | Flamma et al. |
| 2003/0101449 A1 | 5/2003 | Bentolila |
| 2003/0140051 A1 | 7/2003 | Fujiwara |
| 2004/0078293 A1 | 4/2004 | Iverson et al. |
| 2004/0098547 A1 | 5/2004 | Ofek et al. |
| 2004/0148365 A1 | 7/2004 | Tripathi |
| 2004/0162953 A1 | 8/2004 | Yoshida |
| 2005/0091234 A1 | 4/2005 | Hsu |
| 2005/0108433 A1 | 5/2005 | Wu et al. |
| 2005/0125599 A1 | 6/2005 | Gilfix et al. |
| 2005/0131939 A1 | 6/2005 | Douglis et al. |
| 2005/0204108 A1 | 9/2005 | Ofek et al. |
| 2005/0210057 A1 | 9/2005 | Sprague et al. |
| 2005/0228802 A1 | 10/2005 | Kezuka et al. |
| 2005/0246376 A1 | 11/2005 | Lu et al. |
| 2005/0268068 A1 | 12/2005 | Ignatius et al. |
| 2006/0026165 A1 * | 2/2006 | Mohamed et al. .......... 707/10 |
| 2006/0047855 A1 * | 3/2006 | Gurevich et al. .......... 709/247 |
| 2006/0059171 A1 | 3/2006 | Borthakur |
| 2006/0059173 A1 | 3/2006 | Hirsch et al. |
| 2006/0059207 A1 | 3/2006 | Hirsch et al. |
| 2006/0069890 A1 | 3/2006 | Cox et al. |
| 2006/0116990 A1 | 6/2006 | Margolus et al. |
| 2006/0149703 A1 | 7/2006 | Poyourow |
| 2006/0167922 A1 | 7/2006 | Poyourow |
| 2006/0168409 A1 | 7/2006 | Kahn et al. |
| 2006/0182050 A1 | 8/2006 | Dohm |
| 2006/0224846 A1 | 10/2006 | Amarendran et al. |
| 2006/0282457 A1 | 12/2006 | Williams |
| 2006/0293859 A1 | 12/2006 | Pipke |
| 2007/0016727 A1 | 1/2007 | Peters et al. |
| 2007/0022145 A1 | 1/2007 | Kavuri |
| 2007/0124415 A1 | 5/2007 | Lev-Ran et al. |
| 2007/0208788 A1 | 9/2007 | Chakravarty et al. |
| 2007/0220197 A1 | 9/2007 | Lasser |
| 2007/0250519 A1 | 10/2007 | Fineberg |
| 2007/0250670 A1 | 10/2007 | Fineberg |
| 2007/0250673 A1 | 10/2007 | Eidswick |
| 2007/0250674 A1 | 10/2007 | Fineberg et al. |
| 2007/0255758 A1 | 11/2007 | Zheng |
| 2008/0025298 A1 | 1/2008 | Lev-Ran et al. |
| 2008/0052468 A1 | 2/2008 | Speiers |
| 2008/0104347 A1 | 5/2008 | Iwamura et al. |
| 2008/0104443 A1 | 5/2008 | Akutsu et al. |
| 2008/0120459 A1 | 5/2008 | Kaneda et al. |
| 2008/0126176 A1 | 5/2008 | Iguchi |
| 2008/0133536 A1 | 6/2008 | Bjorner et al. |
| 2008/0133561 A1 | 6/2008 | Dubnicki et al. |
| 2008/0244210 A1 | 10/2008 | Vingralek |
| 2008/0256326 A1 | 10/2008 | Paterson et al. |
| 2008/0270461 A1 | 10/2008 | Gordon et al. |
| 2008/0281877 A1 | 11/2008 | Wayda et al. |
| 2008/0294660 A1 | 11/2008 | Patterson et al. |
| 2008/0294696 A1 | 11/2008 | Frandzel |
| 2008/0298282 A1 | 12/2008 | Dawson et al. |
| 2008/0301086 A1 | 12/2008 | Gupta |
| 2008/0301111 A1 | 12/2008 | Statchuk |
| 2008/0301256 A1 | 12/2008 | McWilliams et al. |
| 2009/0013129 A1 | 1/2009 | Bondurant |
| 2009/0013140 A1 | 1/2009 | Bondurant et al. |
| 2009/0019246 A1 | 1/2009 | Murase |
| 2009/0024812 A1 * | 1/2009 | Boyd et al. ............ 711/162 |
| 2009/0037499 A1 | 2/2009 | Muthulingam |
| 2009/0043830 A1 | 2/2009 | Lu et al. |
| 2009/0077252 A1 * | 3/2009 | Abdo et al. ............ 709/231 |
| 2009/0077342 A1 | 3/2009 | Chen et al. |
| 2009/0112945 A1 | 4/2009 | Camble |
| 2009/0113167 A1 | 4/2009 | Camble |
| 2009/0177856 A1 * | 7/2009 | Herne ............ 711/162 |
| 2009/0234821 A1 | 9/2009 | Hirsch et al. |
| 2009/0234855 A1 | 9/2009 | Hirsch et al. |
| 2010/0082765 A1 | 4/2010 | Murase |
| 2010/0100528 A1 | 4/2010 | Brockway et al. |
| 2010/0174881 A1 | 7/2010 | Anglin et al. |
| 2010/0198792 A1 | 8/2010 | Camble |
| 2010/0198832 A1 | 8/2010 | Jones |
| 2010/0205163 A1 | 8/2010 | Eshghi |
| 2010/0223441 A1 | 9/2010 | Lillibridge et al. |
| 2010/0228999 A1 | 9/2010 | Maheshwari et al. |
| 2010/0235372 A1 | 9/2010 | Camble |
| 2010/0235485 A1 | 9/2010 | Lillibridge |
| 2010/0246709 A1 | 9/2010 | Lillibridge |
| 2010/0280997 A1 | 11/2010 | Lillibridge |
| 2010/0281077 A1 | 11/2010 | Lillibridge |
| 2010/0281230 A1 | 11/2010 | Rabii et al. |
| 2011/0040763 A1 | 2/2011 | Lillibridge |
| 2011/0173430 A1 | 7/2011 | Kacin et al. |
| 2011/0252217 A1 | 10/2011 | Lillibridge |

FOREIGN PATENT DOCUMENTS

| | | |
|---|---|---|
| EP | 2038763 | 3/2009 |
| WO | WO-2004046971 A1 | 6/2004 |
| WO | WO-2006030326 | 3/2006 |
| WO | WO-2006032049 | 3/2006 |
| WO | WO-2006094365 | 9/2006 |
| WO | WO-2006094366 | 9/2006 |
| WO | WO-2006094367 | 9/2006 |
| WO | WO-2007127248 | 11/2007 |
| WO | WO-2008005211 | 1/2008 |
| WO | WO-2009054827 | 4/2009 |
| WO | WO-2009054828 | 4/2009 |

(56) References Cited

FOREIGN PATENT DOCUMENTS

| WO | WO-2009054834 | 4/2009 |
|---|---|---|
| WO | WO-2009131585 | 10/2009 |

OTHER PUBLICATIONS

Anthony Ha: Facebook investor backs Chattertrap, a personal assistant for content, Jun. 28, 2010 (6 pages).
August, David. Lecture, COS 217, Optimizing Malloc and Free, http://gee.cs.oswego.edu/dl/html/malloc.html, 8 pps.
Baoyao, Zhou; "Intelligent Web Usage Mining" Nanyang Technological University, Division of Information Systems, School of Computer Engineering, 2004 (94 pages).
Baynote Inc.: The Collective Intelligence Platform, Online, http://www.baynote.com/technology/platform/ 2010 (1 page).
Brin, Sergey, et al., "Copy Detection Mechanisms for Digital Documents", Department of Computer Science, Stanford University, Oct. 31, 1994, p. 1-12.
Clattertrap; Online http://www.clattertrap.com; Jul. 20, 2010 (1 page).
Claypool et al.; "Implicit Interest Indicators", Worcester Polytechnic Institute, Worcester, Computer Science Department Worcester Polytechnic Institute Worcester, MA 01609, USA., 2001 (8 pages).
Eshghi et al., "Jumbo Store: Providing Efficient Incremental Upload and Versioning for a Utility Rendering Service," 2007 (16 pages).
Fenstermacher et al.; "Mining Client-Side Activity for Personalization" Department of Management Information Systems, Eller College of Business and Public Administration, University of Arizona, Jun. 2002 (8 pages).
Hongjun Lu et al: Extending a Web Browser with Client-Side mining, Hong Kong University of Science and Technology Department of Computer Science, Clear Water Bay, Kowloon, Hong Kong, China, 2003 (12 pages).
Hottolink Inc.; "Recognize" Online, http://www.hottolink.co.jp/english/reconize.html, 2009 (2 pages).
HSNW: SRI defense technology spawns civilian application: published Jun. 29, 2010 (2 pages).
Jula, Alin et al., How to Focus on Memory Allocation Strategies, Jun. 18, 2007, 29 pps.
L. L. You and C. Karamanolis. Evaluation of Efficient Archival Storage Techniques. In Proceedings of the 21st IEEE/ 12th NASA Goddard Conference on Mass Storage Systems and Technologies, pp. 227-232, College Park, Maryland, Apr. 2004.
Litwin, Witold, Linear Hashing: A new tool for file and table addressing. I.N.R.I.A., published by IEEE 1980; pp. 212-223.
Manber, Udi, "Finding Similar Files in a Large File System," Department of Computer Science, University of Arizona, TR 93-33, Oct. 1993, (11 pages).
Muthitacharoen, Athicha et al., A Low-bandwidth Network File System, MIT Lab for Compuer Science and NYU Dept. of Computer Science, 14 pps.
Rabin, M.O., "Fingerprinting by Random Polynomials," Technical Report, Center for Research in Computing Technology, Harvard University, 1981, Report TR-15-81 (14 pages).
Sendhikumar et al,, "Personalized ontology for web search personalization" Anna University, Chennai, India , 2008 (7 pages).
Shahabi et al.; "Yoda an Accurate and Scalable Web based Recommendation System?" University of SouthernCalifornia, Los Angeles, Sep. 2001 (14 pages).
Shahabi et al.; A Framework for Efficient and Anonymous Web Usage Mining Based on Client-Side Tracking"", University of Southern California, Los Angeles, 2002 (48 pages).
Shankar et al,; ""Personalized Web Search Based on Client Side Ontology"", CS 498: B.Tech Project,10. IIT Kanpur, India 2010 (9 pages).
Why WUBAT?Website User Behavior &Analysis Tool, Wubat, Online, dated on or before Oct. 12, 2010, http://www.wubat.com/ (3 pages).
You L. L. et al., "Deep Store an Archival Storage System Architecture" Data Engineering, 2005. ICDE 2005. Proceedings. 21st. intl Conf on Tokyo, Japan, Apr. 5-8, 2005, pgs.
Bigelow, Stephen, Data Dedupiication Explained. 2007 Storage Magazine, http://cdn.ttgmedia.com/searchStorage/downloads/StorageExtra_DataDupe.pdf, 4 pps.
ComputerWeekly.com, How data dedublioation works, TechTarget, Nov. 6, 2007, http://www.computerweekly.com/feature/How-data-deduplication-works, 2 pps.
Freeman, Larry, Looking Beyond the Hype: Evaluating Data Deduplication Solutions, Netapp White Paper, WP-7028-0907, Sep. 2007, http://storage-brain.com/wp-content/uploads/papers/Evaluating_Data_Deduplication_Solutions.pdf, 12 pps.
Llewellyn, Mark, COP 3530C—Computer Science III, Summer 2002, http://www.cs.ucf.edu/courses/cop3530-su02, 24 pps.
Manegold, Stefan et al, Databases Techniek, 2005, http://homepages.cwi.nl/~manegold/teaching/DBtech, Archiviert in http://www.archive.org am Sep. 16, 2005, 20 pps.
Zaiane, Osmar R et al, Database Systems and Structures, CMPT 354: Summer 1998, http://www.cs.sfu.ca/CourseCentral/354/zaiane/, 18 pps.
Zhu, Benjamin et al, Avoiding the disk bottleneck in the data domain deduplication file system, Proceedings of the 6th USENIX Conference on File and Storage Technologies, Feb. 29, 2008, http://usenix.org/events/fast08/tech/full_papers/zhu.pdf, pp. 269-282.
Hewlett-Packard Development Company, L.P., "Quickspecs," HP OpenView Storage Data Protector, Aug. 1, 2005, <http://h18000.www1.hp.com/products/quickspecs/archives_North_America/11671_na_v11/11671_na.pdf> (22 pages).
Data Archive Corporation, "More About Centera," dated on or before Mar. 22, 2006, <http://web.archive.org/web/20060322044416/http://www.emc-centera.com/more-about-centera.htm> (2 pages).
Data Archive Corporation, "What is Centera?," dated on or before Mar. 22, 2006, <http://web.archive.org/web/20060322044412/http://www.emc-centera.com/what-is-centera.htm> (1 page).
EMC Corporation, "EMC Centera Partner Solutions," Feb. 2003, <https://www.emc.com/collateral/hardware/solution-overview/h787-centera-documentum.pdf> (4 pages).
Hewlett-Packard Development Company, L.P., "Disk-assisted backup white paper," Sep. 2006, <https://h20565.www2.hpe.com/hpsc/doc/public/display? sp4ts.oid=3241176&docId=emr_na-c00668397&docLocale=en_US> (30 pages).
Hewlett-Packard Development Company, L.P., "HP Data Protector Software Advanced Backup to Disk Integration with Virtual Tape Libraries," Nov. 2008, pp. 1-23.
Hewlett-Packard Development Company, L.P., "HP Reference Information Storage System (RISS) Installation and Startup Service and HP Reference Information Manager (RIM) Installation and Startup Service," Mar. 2005, <ftp://ftp.hp.com/pub/services/storage/info/riss_rim_install_datasheet.pdf> (7 pages).
Hewlett-Packard Development Company, L.P., "HP StorageWorks Deduplication and replication solutions guide," Apr. 2009, pp. 1-138.
Hewlett-Packard Development Company, L.P., "HP StorageWorks Virtual Library System," Solutions Guide, Dec. 2007, pp. 1-46.
Lea, D., "A Memory Allocator," (Research Paper), Apr. 2000, 6 pages.
TechnoPlanet Productions Inc., "HP Introduces New Information Lifecycle Management Solutions," 2004, <http://e-channelnews.com/story_print_friendly.php?ref=409283> (2 pages).

\* cited by examiner

COMMUNICATING CHUNKS BETWEEN DEVICES

CROSS-REFERENCE TO RELATED APPLICATION

This application is a divisional of U.S. application Ser. No. 12/239,263, filed Sep. 26, 2008, entitled "Communicating Chunks Between Devices," now U.S. Pat. No. 8,140,637, which claims the benefit under 35 U.S.C. §119(e) of U.S. Provisional Application No. 61/000,427, filed on Oct. 25, 2007, both hereby incorporated by reference.

BACKGROUND OF THE INVENTION

Data held on a primary data storage medium may be backed-up to secondary data storage medium. The secondary data storage medium may be in a different location to the primary data storage medium. Should there be at least a partial loss of the data on the primary data storage medium, data may be recovered from the secondary data storage medium. The secondary data storage medium may contain a history of the data stored on the primary data storage medium over a period of time. On request by a user, the secondary data storage medium may provide the user with the data that was stored on the primary data storage medium at a specified point in time.

Data back-up procedures may be carried out weekly, daily, hourly, or at other intervals. Data may be backed-up incrementally, where only the changes made to the data on the primary data medium since the last back-up are transferred to the secondary data storage medium. A full back-up may also be performed, where the entire contents of the primary data medium are copied to the secondary data medium. Many other back-up strategies exist.

When backing-up data, a particular part of the data being backed-up may have previously been stored to the primary data storage medium, which may especially be the case when full back-ups are carried out. Storing the same data numerous times represents an inefficient use of a data storage medium.

SUMMARY OF INVENTION

An embodiment of the present invention provides a communication apparatus, for connection to a remote storage device, comprising: a chunking and identifier generation module operable to receive data, to process the data into one or more chunks, to generate a first chunk identifier, representative of the identity of a first of the or each chunk of data and, upon processing of the data; and a first interface for communication with the remote storage device, wherein the interface is operable to send the first chunk identifier to the remote storage device, and to send the first chunk of data to the remote storage device upon receipt of a transfer instruction from the remote storage device; a second interface for communication with the remote storage device and operable to send and receive data to the remote storage device independently of the chunking and identifier generation module.

An embodiment of the present invention provides a storage device for connection to a remote communication apparatus, the storage device comprising: a first interface for coupling to the remote communication apparatus, the first interface being operable to receive a first identifier representative of the identity of a first data chunk from the remote communication apparatus, to issue a transfer instruction to the remote communication apparatus if the first identifier is an unknown identifier, and receive and store on the storage device the first data chunk in response to the issuance of the transfer instruction to the remote communication apparatus; and a second interface operable to receive data and process the data into one or more data chunks for storage on the storage device.

An embodiment of the present invention provides a communication apparatus, for connection to a remote storage device, comprising: a module for communication with a software application and operable to receive instructions to copy data to the remote storage device; a chunking and identifier generation module operable to receive the data, to process the data into one or more chunks, to generate a first chunk identifier, representative of the identity of a first of the or each chunk of data and, upon processing of the data, to initiate the issuance of a confirmation signal to the software application indicating that the data has been copied to the remote storage device; and an interface for communication with the remote storage device, wherein the interface is operable to send the first chunk identifier to the remote storage device, and to send the first chunk of data to the remote storage device upon receipt of a transfer instruction from the remote storage device.

An embodiment further comprises a second interface for communication with the remote storage device, wherein the second interface is operable to send data to the remote storage device independently of the chunking and identifier generation module.

An embodiment of the present invention provides a data storage system having a first processing unit and a second processing unit remote from the first processing unit, the system comprising: a module for receiving an instruction from a software application for the copying of data from the first to the second processing unit and, in response to the receipt of the instruction; and a chunking and identifier generation module linked to a first interface and operable to process the data to generate one or more data chunks and one or more identifiers each representative of the identity of a data chunk and, upon processing the data, to initiate issuance of a confirmation signal to the software application that the data has been copied, wherein the first interface links the second processing unit to the first processing unit and the first and second processing units are operable to communicate with each other across the first interface using the one or more identifiers in order to copy the data chunks which are not known to the second processing unit.

An embodiment further comprises a second interface which allows data to be copied between the first and second processing units independently of the chunking and identifier generation module.

An embodiment of the present invention provides a method of transferring data from a primary data storage medium to a remote secondary data storage device which is remote from the primary data storage medium, the method comprising: issuing, from the primary data storage medium, a confirmation signal that the data has been copied to the remote secondary data storage device in response to receiving and independently of whether the data has been copied; sending a first identifier from the primary data storage medium to the remote secondary data storage device, the first identifier being representative of the identity of a first chunk of the data; receiving the first identifier at the remote secondary data storage device and comparing the first identifier to one or more stored identifiers; sending a transfer instruction from the remote secondary data storage device to the primary data storage medium if the first identifier does not at least partially match a stored identifier; and transferring the first data chunk from the primary data storage medium to the remote secondary data storage device in response to the transfer instruction.

BRIEF DESCRIPTION OF THE DRAWINGS

Embodiments of the invention will now be described, by way of example, with reference to the accompanying drawings in which.

DETAILED DESCRIPTION

Data

Figure 1:
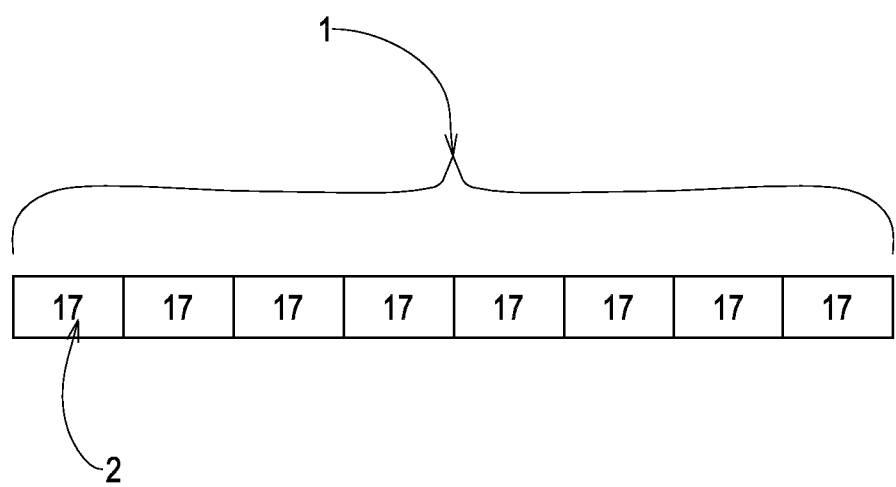
FIG. 1 shows a schematic representation of a data set.

FIG. 1 shows a schematic representation of a data set 1 comprising data 2. A data set 1 may comprise part of a larger data set (not shown) or may be a complete data set in its own right. The data 2 may be separated into one or more blocks of data (not shown). Each block of data may be a file, each block of data may comprise part of a file (not shown), or each block of data may contain more than one file or part of a file or both. The data 2 may also include one or more block separators (not shown)—marking, for example, the end of a block of data; information concerning the location of one or more block separators may also be included in the data 2. The data 2 may comprise a volume of data (not shown) or part of a volume of data. Thus, data 2 may comprise, for example, a data set 1, part of a data set 1, a data block, part of a data block, a data volume, and/or part of a data volume.

System Overview

Figure 2:
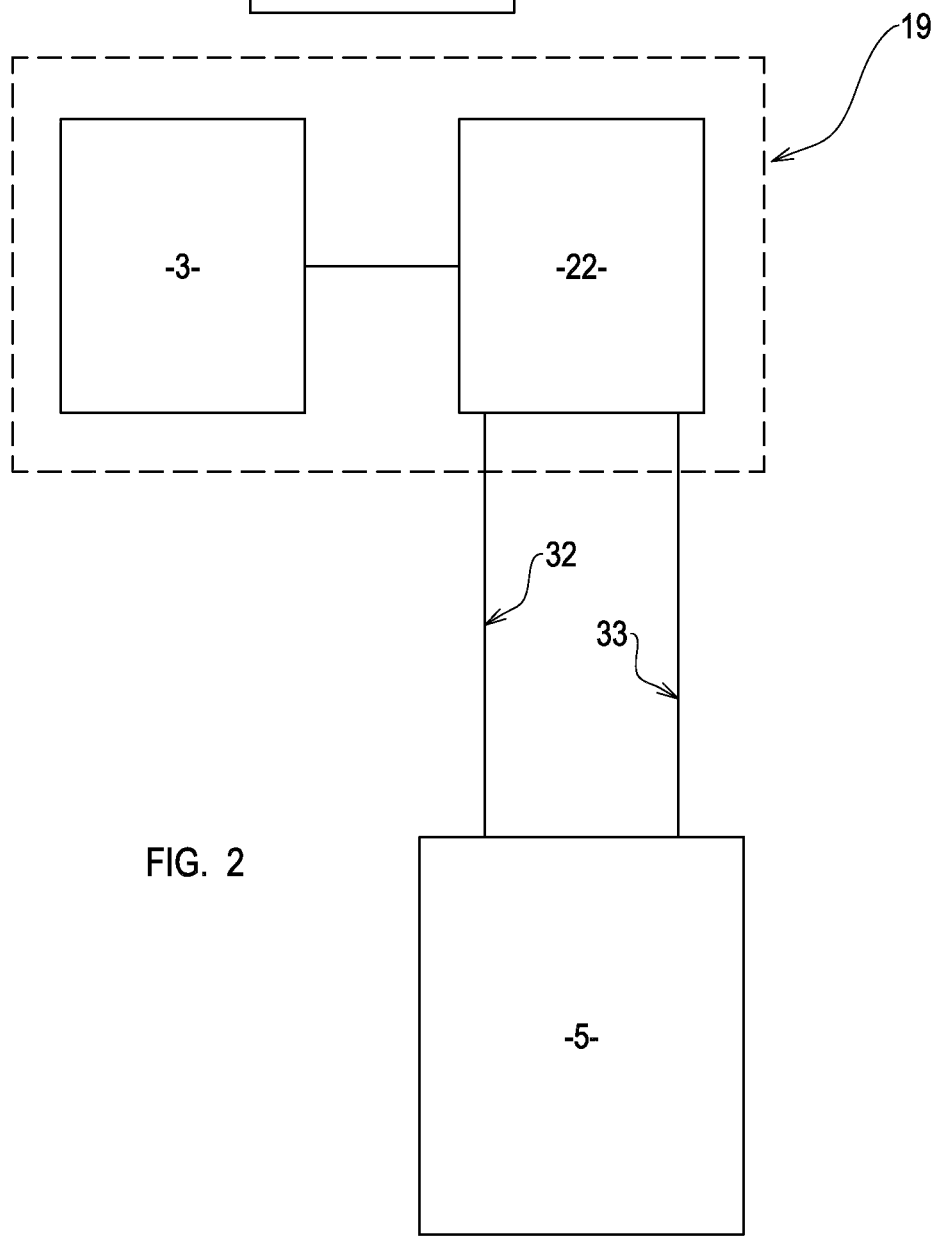
FIG. 2 shows a schematic representation of an embodiment of the present invention.

As shown in FIG. 2, a system of an embodiment of the present invention comprises a data processing apparatus 3, a data communication apparatus 22, a primary network 32, a secondary network 33, and a second data storage device 5. In an embodiment, the primary 32 and secondary 33 networks comprise a signal physical network which may include two logical networks corresponding with the primary 32 and secondary networks 33.

Data Processing Apparatus

Figure 3:
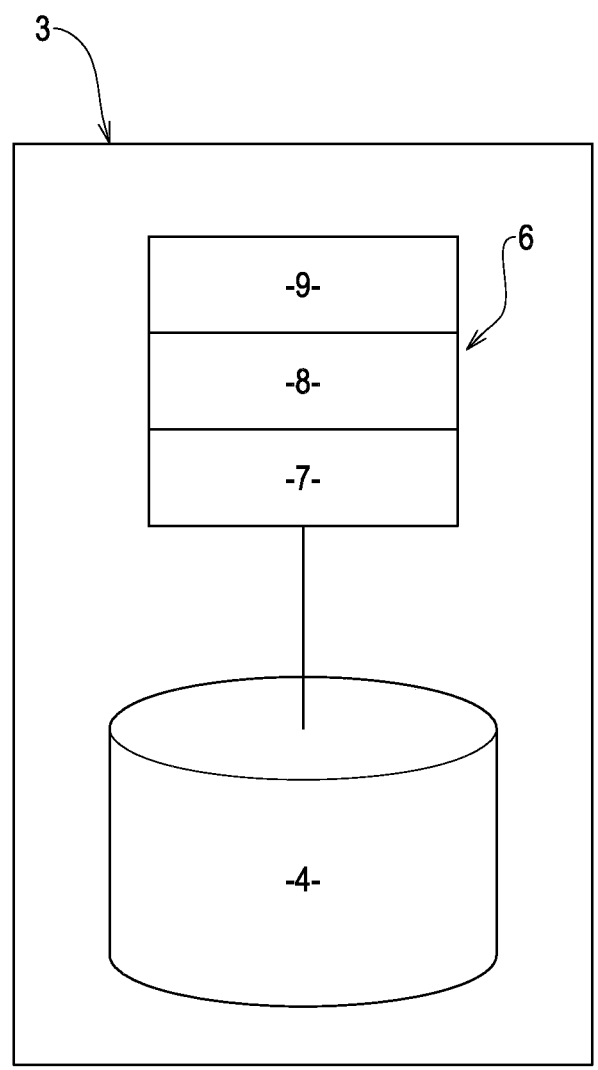
FIG. 3 shows a schematic representation of a data processing apparatus according to an embodiment.

As shown in FIG. 3, the data processing apparatus 3 according to an embodiment of the present invention includes a source 4 of data 2 which may be accessed through a mass storage stack or other logical data transport structure 6. The data 2 may include one or more data sets 1, or one or more partial data sets 1 (as described above). In an embodiment of the invention (see FIG. 4), the source 4 of data 2 does not form part of the data processing apparatus 3 but is connected to the data processing apparatus 3.

The source 4 of data 2 may comprise a primary data storage medium or a storage device containing at least part of the data 2 which is stored on a primary data storage medium (for example, in an embodiment, the source 4 of data 2 comprises one or more memory elements linked to the primary data storage medium). The primary data storage medium may form part of the data processing apparatus 3 or may be separate from the data processing apparatus 3.

Accordingly, the source 4 of data 2 may comprise volatile or non-volatile memory, or a combination of volatile and non-volatile memory. The source 4 of data 2 and/or the primary data storage medium may, in an embodiment, comprise a tape drive, a tape library, a virtual tape library, a magnetic storage device, an optical storage device, an electronic storage device, two or more such devices and/or one or more memory elements connected thereto.

The source 4 of data 2 is accessed through the logical data transport structure 6 (which may be described as a first input/output logic stack 6) of the data processing apparatus 3 which may, in an embodiment, comprise a host bus adapter 7, a disk driver 8, and a file system 9—see FIG. 3. The logical data transport structure 6 may be implemented in software of the data processing apparatus 3. The logical data transport structure 6 may form part of an operating system of the data processing apparatus 3.

Data Communication Apparatus

Figure 7:
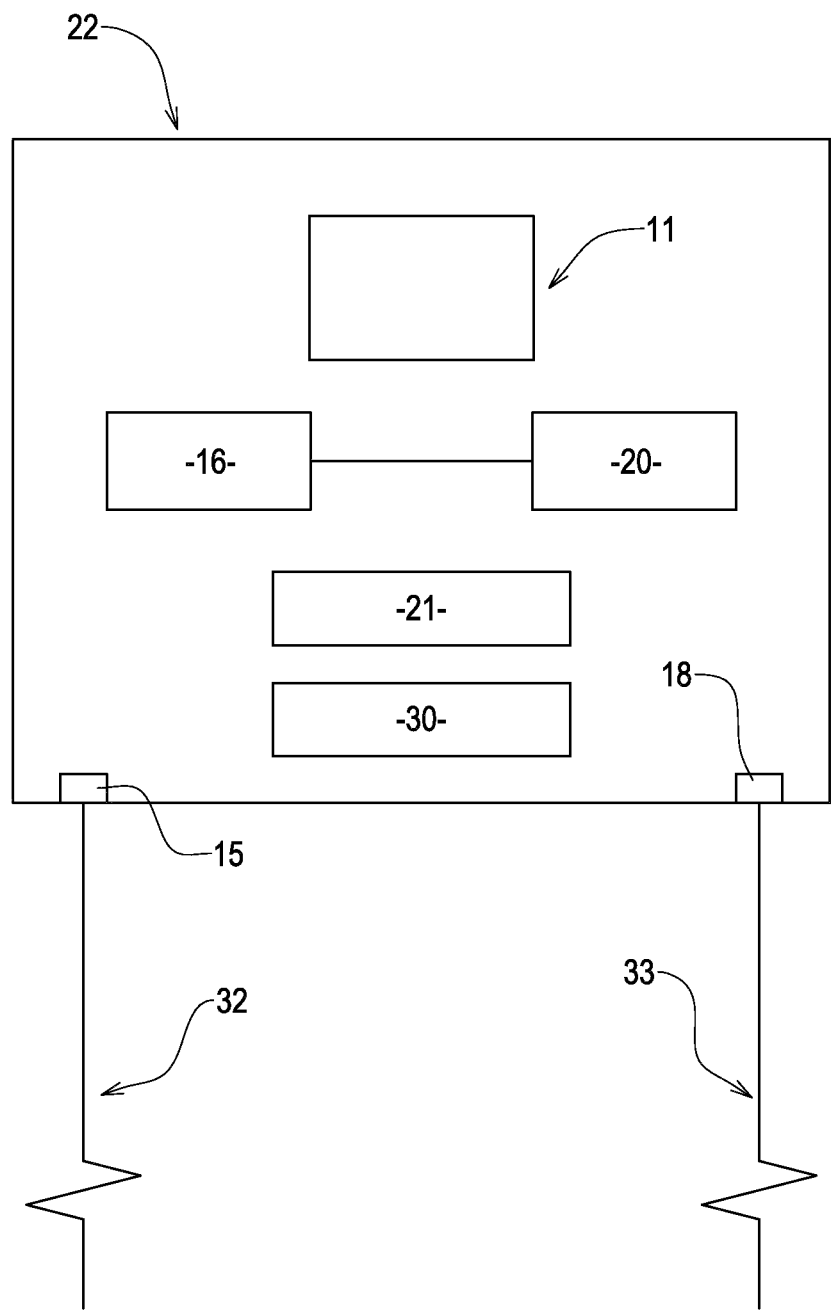
FIG. 7 shows a schematic representation of a data communication apparatus according to an embodiment.

The data communication apparatus 22 (see FIGS. 5 and 7) is connected to the data processing apparatus 3 and may, in an embodiment, of the invention, form part of the data processing apparatus 3 or be housed in the same unit 19 as the data processing apparatus 3. The unit 19 may be a computer server.

The data communication apparatus 22 includes a primary network connection 15 to the primary network 32. The data communication apparatus 22 may comprise a logical data transport structure 11 which may be described as a second input/output logic stack (see FIG. 6).

Data 2 may be passed from the data processing apparatus 3 to the data communication apparatus 22. The data 2 can be passed from the data communication apparatus 22 over the primary network 32 to the secondary data storage device as part of, for example, a backup operation. Thus, data 2 may be copied from the source 4 of data 2 (and/or the primary data storage medium) to the secondary data storage device 5.

Figure 6:
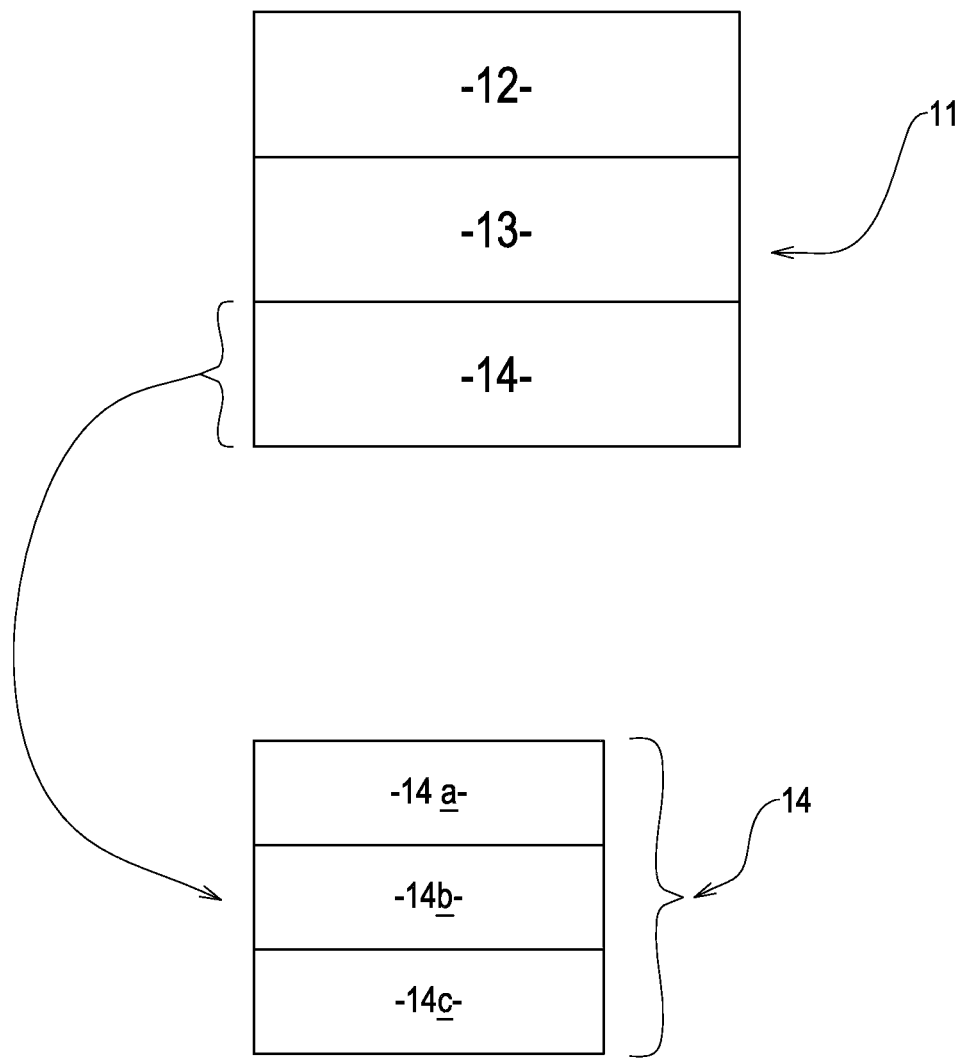
FIG. 6 shows a schematic representation of a second input/output logic stack according to an embodiment.

In an embodiment, the second input/output logic stack 11 comprises a tape driver 12, a Small Computer System Interface (SCSI) controller 13, and a host bus adapter 14 (see FIG. 6). The second input/output logic stack 11 is utilized to access data 2 passed to the data communication apparatus 22 and to pass data 2 from the data communication apparatus 22 across the primary 32 or secondary 33 networks to the secondary data storage device 5.

The host bus adapter 14 may comprise an iSCSI driver 14a, a TCP/IP driver 14b and an Ethernet 14c level (which corresponds with the primary 32 or secondary 33 network).

The second input/output logic stack 11 may form part of a single input/output logic stack (not shown) of the data communication apparatus 22 and the data processing apparatus 3; this single stack may incorporate both the first and second input/output logic stacks 6,11.

Figure 5:
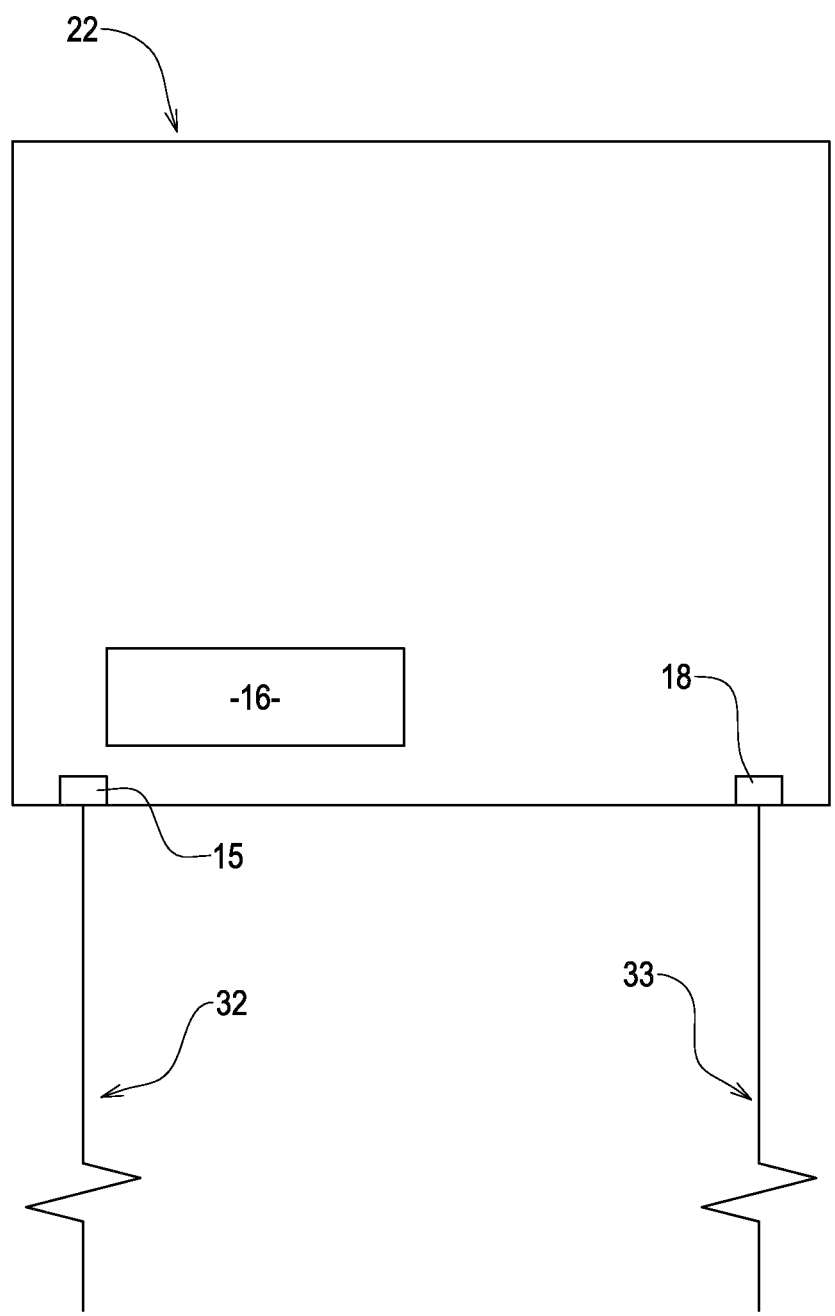
FIG. 5 shows a schematic representation of a data communication apparatus according to an embodiment.

In an embodiment of the invention, the data communication apparatus 22 includes a data chunking module 16 (see FIG. 5). In an embodiment of the invention, the second input/output logic stack 11 includes the data chunking module 16. The data chunking module 16 may, in an embodiment, be located (logically) between the tape driver 12 and the SCSI controller 13 of the second input/output logic stack 11 and may intercept data 2 as it passes through the data communication apparatus 22. In an embodiment, the data chunking module 16 is located between the iSCSI driver 14a of the host bus adapter 14 and the TCP/IP driver 14c thereof. In embodiments, the data chunking module 16 is located, logically, between above the TCP/IP driver 14c in the second input/output logic stack 11.

Figure 4:
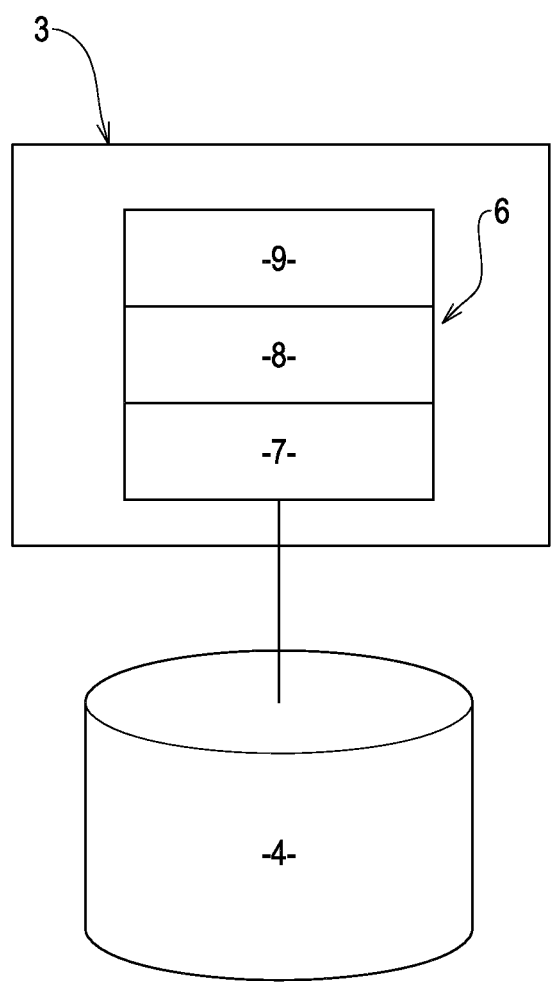
FIG. 4 shows a schematic representation of a data processing apparatus according to an embodiment.

The data chunking module 16 is operable to process data 2 which the module 16 receives into one or more data chunks 17; the one or more data chunks 17 may comprise a series of data chunks 17 which together represent a data set 1 or a part thereof (see FIG. 4).

When data 2 is processed into one or more data chunks 17, the data 2 is partitioned into one or more sections of data which will each form a data chunk 17. The separation process may be in accordance with a number of methods: for example, the separation may be carried out in accordance with a data compaction algorithm or the separation may be a simple separation of the data into sections of predetermined size in accordance with a predetermined sequence of sizes.

Figure 10:
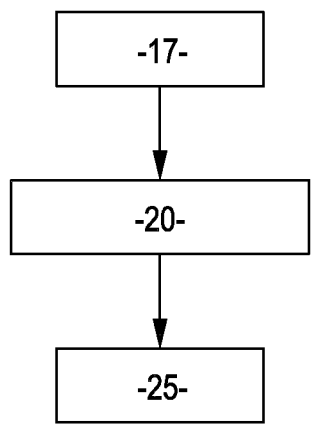
FIG. 10 shows a schematic representation of an chunk identifier generation module according to an embodiment.

Each data chunk 17 is given a unique or substantially unique identifier 25 (a chunk identifier 25) which is at least partially based or dependent on the content of the data chunk 17. Thus, each data chunk 17 may be said to be associated with a chunk identifier 25. In an embodiment of the invention, a chunk identifier generation module 20 is provided for this purpose (see FIGS. 7 and 10). The chunk identifier generation module 20 may form part of the data chunking module 16 or may be a separate module which is operable to receive the one or more data chunks 17 and generate a unique or substantially unique identifier for the or each data chunk 17 using an algorithm. The algorithm may be a hashing algorithm such as SHA1, SHA2, or MD5. In an embodiment of the invention, the chunk identifier 25 may be unique such that it is computationally infeasible that the same chunk identifier 25 would be associated with two different data chunks 17.

In an embodiment, the data chunking module 16 and the chunk identifier generation module 20 may be considered to be a single chunking and identifier generation module or apparatus.

The data chunking module 16 may, in an embodiment, include a spool or buffer 21 which comprises one or more data storage or memory elements. These one or more elements may comprise non-volatile, or volatile memory or a combination of non-volatile and volatile memory. The spool or buffer 21 is operable to store one or more data chunks 17, one or more chunk identifiers 25, and/or a data log 30.

In an embodiment, the data log 30 comprises a record of the one or more data chunks 17 stored in the spool or buffer 21 and an indication of the length of time that the data chunk 17 has been stored in the spool or buffer 21. The record of the one or more data chunks 17 which is (or may be) maintained in the data log 30 may comprise a chunk identifier 25 for the or each data chunk 17.

In an embodiment, the data log 30 includes information regarding the order of the data 2 in the one or more data chunks 17 stored in the spool or buffer 21 in the original data 2 which was received by the data communication apparatus 22 from the data processing apparatus 3; such information comprises, in an embodiment, the logical order of data chunks 17 which form the data 2 which was received from the data processing apparatus 3. In an embodiment, the information regarding the order of the data 2 may comprise, for each data chunk 17, a physical address (for example, of a location in the source 4 of data 2 (and/or in the primary data storage medium) for the start of the data 2 represented by that data chunk 17 and a physical address for the end of the data 2 represented by that data chunk 17 or a physical size of the data 2 represented by that data chunk 17 (which would allow the physical location of the end of the data 2 represented by that data chunk 17 to be determined). As will be discussed below, because the spool or buffer 21 may not hold information concerning all of the data 2 which is to be passed to the secondary data storage device 5, the data log 30 may include information which concerns one or more data chunks 17 which are not currently held in the spool or buffer 21 but which may have been or may will be stored in the spool or buffer 21 at a different time.

A secondary network connection 18 is provided for connection of the data communication apparatus 22 to the secondary storage device 5 through the secondary network 33. The secondary network connection 18 is operable to transmit one or more chunk identifiers 25 (ie. transfer chunk identifiers) and/or one or more data chunks 17 (ie. transfer data chunks) to the secondary storage device 5 across the secondary network 33.

These one or more data chunks 17 and/or chunk identifiers 25 may have been stored in the spool or buffer 21 awaiting transmission to the secondary data storage device 5 through the secondary network connection 18. The secondary network connection 18 may, in an embodiment, be operable to transmit information regarding the location of the data 2 represented by one or more data chunks 17 within the data 2 received by the data communication apparatus 22 from the data processing apparatus 3; in an embodiment this information comprises a physical or logical location as discussed above in relation to the data log 30 of the data communication apparatus 22 and the spool or buffer 21; in an embodiment, this information is conveyed by the order of the chunk identifiers 25 which are transmitted through the secondary network connection 18 to the secondary data storage device 5; in an embodiment, this information is derived from the data log 30.

In an embodiment, when a threshold has been reached, at least one of the chunk identifiers 25 which is stored in the spool or buffer 21 is transmitted to the secondary storage device 5 through the secondary network connection 18 of the data communication apparatus 22. In an embodiment, when a threshold has been reached, all or substantially all of the chunk identifiers 25 which are stored in the spool or buffer 21 are transmitted to the secondary data storage device 5 through the secondary network connection 18 of the data communication apparatus 22.

In an embodiment, a chunk identifier 25 is transmitted to the secondary data storage device 5 through the secondary network connection 18 of the communication apparatus 22 substantially as soon as it has been generated and prepared for transmission (in other words, there is substantially no delay between the generation of a chunk identifier 25 and its transmission to the secondary data storage device 5—in an embodiment, some delay will be incurred as part of the processing of the chunk identifier 25 and/or the passing of the chunk identifier 25 to the secondary network connection 18).

The threshold may be a time period. The threshold may be a predefined number of chunk identifiers 25. The threshold may be determined by the combined size of the data chunks 17 which are stored in the buffer or spool 21. The threshold may be determined by a decrease in traffic on the secondary network or a decrease in traffic below a predetermined level. The threshold may be determined by the time of day, the day of the week, and/or the week of the month. The threshold may be determined by the amount of free storage space on the data processing apparatus 3 and/or data communication apparatus 22 falling below a predetermined level. In an embodiment, a series of thresholds are set and the first threshold to be reached will trigger the aforementioned operation(s).

The secondary network connection 18 is, in an embodiment of the invention, connected to the data chunking module 16 and/or the chunk identifier generation module 20 through at least part of the rest of the second input/output logic stack 11. In an embodiment of the invention, the connection 18 is made through dedicated logic circuits and/or software which does not form part of the second input/output logic stack 11.

Secondary Data Storage Device

Figure 8:
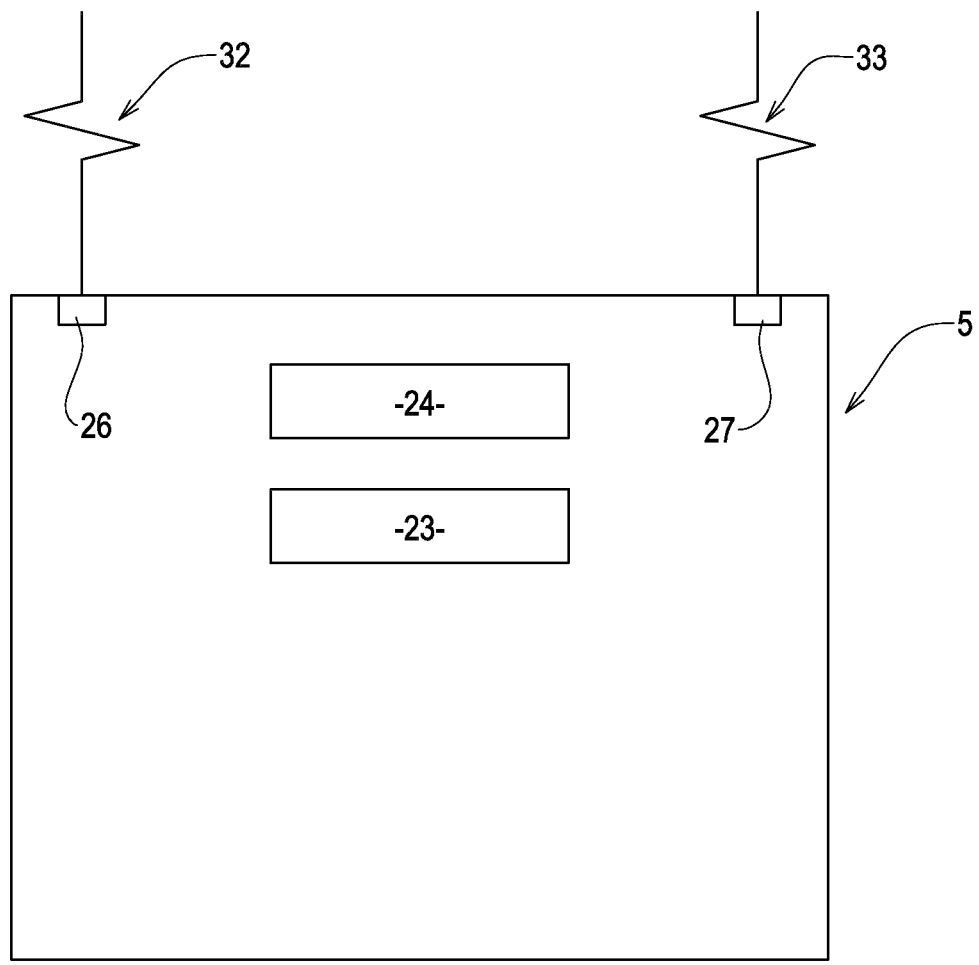
FIG. 8 shows a schematic representation of a secondary data storage device according to an embodiment.
Figure 9:
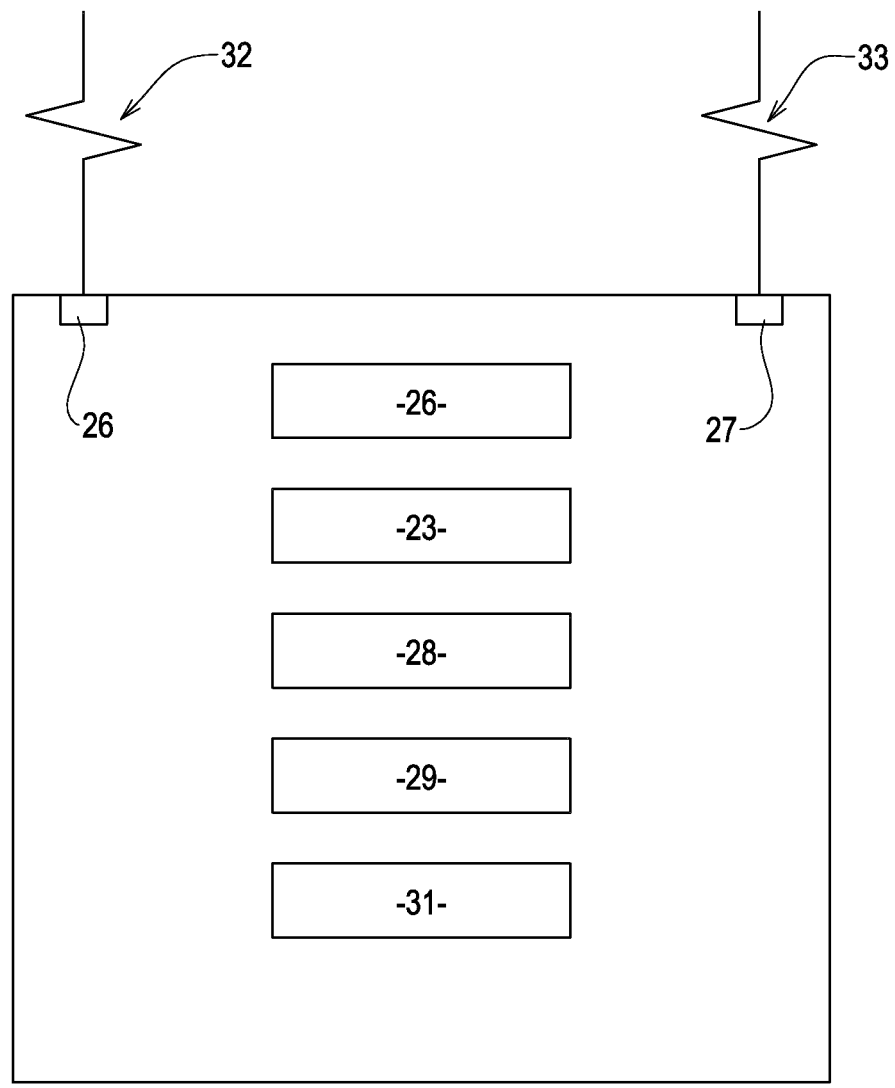
FIG. 9 shows a schematic representation of a secondary data storage device according to an embodiment.

The secondary data storage device 5 (see FIGS. 8 and 9) may comprise a virtual tape library, a tape library, a tape drive, a compacting virtual tape library, two of more of the aforementioned devices and/or one or more other data storage devices.

In an embodiment of the invention, the secondary data storage device 5 includes a primary 26 and a secondary 27 network connection which are connected through the primary 32 and secondary 33 networks to the corresponding network connections 15,18 of the data communication apparatus 22.

In an embodiment, the primary 32 and secondary 33 networks are the same physical network. The primary 32 and secondary 33 networks may be wired or wireless networks. Communication across the primary 32 and secondary 33 networks may be in accordance with a protocol such as iSCSI (the internet small computer system interface), Ethernet or internet protocol. The protocols utilized on the primary 32 and secondary 33 networks may be different. In an embodiment of the invention a fibre channel (FC) may be used for the primary and/or secondary networks. In an embodiment the fibre channel may, for example, have a point-to-point, arbitrated loop, or switched fabric topology. In an embodiment, the primary and secondary networks are independent. In an embodiment, the primary network is independent of the data chunking module 16 and the chunk identifier generation module 20 of the data communication apparatus 22.

In an embodiment, the secondary data storage device 5 may receive data 2 from the data communication apparatus 22 over the primary network 32. This data 2 may then be stored on the secondary data storage device 5. In an embodiment, the secondary data storage device 5 includes a data chunking module (not shown) which can process data received across the primary network 32 from the data communication apparatus 22 into one or more data chunks 17. The data chunking module may be substantially identical to the corresponding module 16 in the data communication apparatus 22. A chunk identifier 25 is provided or generated for each of the data chunks 17. The chunk identifier may be generated in the same manner as in the data communication apparatus 22. A chunk identifier generation module 28 may be provided in the secondary data storage device for this purpose (see below).

The secondary data storage device 5 may include a record 23 of stored data chunks 17. The record 23 may comprise an index or table which includes information regarding the identity of one or more data chunks 17 stored on the secondary data storage device 5. The record 23 may include location information concerning the logical and/or physical location of the one or more data chunks 17 stored in the secondary data storage device 5; in an embodiment the record 23 includes information concerning both the logical and physical location of the one or more data chunks 17. In an embodiment, the location information is a pointer to the location of a respective data chunk 17. In an embodiment, the location information is a location which is calculated from a position of known location and provided as an offset of the number of bits or bytes from that known location. In an embodiment of the invention, the location information comprises a location which is calculated from a position of known location and provided as an offset of the number of data chunks 17 from that known location.

In an embodiment of the invention, the information concerning the identity of the one or more data chunks 17 stored in the record 23 of the secondary data storage device 5 comprises one or more unique or substantially unique identifiers 25 which are at least partially based or dependent on the content of the data chunk 17. In an embodiment of the invention the one or more identifiers 25 have been generated for the or each data chunk 17 using an algorithm. The algorithm may be a hashing algorithm such as SHA1, SHA2, or MD5. In an embodiment of the invention, the chunk identifier 25 may be unique such that it is computationally infeasible that the same chunk identifier 25 would be associated with two different data chunks 17. In an embodiment, the one or more chunk identifiers 25 used in the secondary data storage device 5 are of the same type as the one or more chunk identifiers 25 used in the data communication apparatus 22. In other words, in an embodiment, a given data chunk 17 processed by the data communication apparatus 22 will be associated with a chunk identifier 25 which is identical to or substantially identical to the data chunk identifier 25 which is associated with the same data chunk 17 which is stored in the secondary data storage device 5.

In an embodiment, the record 23 may be separated into sub-records (not shown) which share, for example, common most significant bits of chunk identifiers 25. Thus, searching through the record 23 can be simplified.

In an embodiment, the secondary data storage device 5 includes a comparison module 24 which is operable to receive one or more chunk identifiers 25 from the data communication apparatus 22 through the secondary network connection 27 and compare the one or more received chunk identifiers 25 with the stored chunk identifiers 25 in the record 23.

If the comparison module 24 locates a chunk identifier 25 in the record 23 which matches (or substantially matches) a received chunk identifier 25, then the comparison module 24 is operable to output a first signal. If no matching (or no substantially matching) chunk identifier 25 is located, then the comparison module 24 is operable to output a second signal. A chunk identifier 25 matches a received chunk identifier 25 if it is identical to the received chunk identifier 25. In an embodiment, the first and second signals are transmitted to the data communication apparatus 22 through the secondary network 33.

In an embodiment the primary network 31 is independent of the data comparison module 24 of the secondary data storage device 5.

The secondary data storage device 5 is operable to receive one or more data chunks 17 through the secondary network from the data communication apparatus 22. The secondary storage medium 5 is operable to store at least one data chunk 17 received through the secondary network connection 27.

In an embodiment, the secondary data storage device 5 includes a chunk identifier generation module 28 which is operable to generate a unique or substantially unique chunk identifier 25 (as discussed above) from the received data chunk or chunks 17. The generated chunk identifier 25 may be added to the record 23 of the secondary data storage device 5. Location information concerning the logical or physical location of the data chunk 17 in the secondary data storage device 5 may be stored in the record 23 with the generated chunk identifier 25. The chunk identifier generation module 28 may be operable to receive the one or more data chunks 17 and generate a unique or substantially unique identifier 25 for the or each data chunk 17 using an algorithm. The algorithm may be a hashing algorithm such as SHA1, SHA2, or MD5. In an embodiment, the method utilized to generate a chunk identifier 25 by the chunk identifier generation module 28 is the same method used in the corresponding module 20 of the data communication apparatus 22. Thus, a given data chunk 17 will cause the generation of an identical or substantially identical data chunk identifier 25 in both of the chunk identifier generation modules 20,28.

In an embodiment, the secondary data storage device 5 does not include a chunk identifier generation module 28. The secondary storage device 5 stores one or more data chunk identifiers 25 which are received from the data communication apparatus 22 and (as will be described below) associates these one or more chunk identifiers 25 with respective data chunks 17 which are received from the data communication apparatus 22. The one or more chunk identifiers 25 may, in this embodiment, be stored in the record 23. Location information concerning the location of one or more data chunks 17 associated with the one or more chunk identifiers 25 stored on the secondary storage device 5 may also be maintained in the record 23.

The secondary storage device 5, in an embodiment, includes a data set record 29. The data set record 29 may include information which allows a data set 1 or part thereof to be formed from one or more data chunks 17. In an embodiment, the data set record 29 includes the chunk identifier or identifiers 25 for one of more data chunks 17 stored in a logical order such that a data set 1 may be produced by placing the one or more data chunks 17 in the specified order. In an embodiment, the data set record 29 includes a one or more pointers to the location of respective data chunks 17 which are stored on the secondary data storage device 5. In an embodiment, the data set record 29 includes one or more references to one or more respective entries in the record 23 of stored data chunks 17. Thus, it will be appreciated that a data set 1 which is stored on the secondary data storage device 5 can be formed by arranging one or more data chunks 17 in an order specified by a record 23 for that data set 1. In an embodiment, a single record 23 is maintained for several data sets 2. In an embodiment, a single record 23 is maintained for a data volume or manifest which may comprise one or more data sets 1. In an embodiment, the data set record 29 is generated using information which is received from the data communication apparatus 22. In an embodiment, the data set record 29 is generated from information received from the data chunking module and/or the chunk identifier generation module 28 of the secondary data storage device 5.

The secondary data storage device 5 is, in an embodiment, operable to output one or more data sets 1 through the primary network connection 26 (and primary network 32) to the data communication apparatus 22.

The secondary data storage device 5 may include a memory (which may be volatile memory, non-volatile memory, or a mixture of both)—not shown—in which one or more data sets 1 can be formed by reconstructing the or each data set 1 from its constituent data chunks 17 using the data set record 23.

Software Application

A software application 10 is, in an embodiment, provided to initiate and/or control the movement of at least a portion of the data 2 from the source 4 of data 2 of the data processing apparatus 3 towards the secondary data storage device 5. In an embodiment, this movement of data 2 is part of a backup operation. Similarly, the software application 10 is, in an embodiment, provided to initiate and/or control the movement of at least a portion of data 2 from the secondary data storage device 5 to the source 4 of data 2 and/or the primary data storage medium. In an embodiment, this movement of data is part of a restore operation.

The software application 10 may comprise a series of computer instructions which can be processed by the data processing apparatus 3 and/or a separate processing apparatus (not shown) which is connected to the data processing apparatus 3. The software application 10 may be operable to vary its operation as a result of input from a user or may be an entirely automated application with little or no user input. Although described as a software application, the software application 10 may be implemented in hardware or a combination of software and hardware. In an embodiment, the data communication apparatus 22 is provided with a module (not shown) for communication with the software application 10.

Backup Operation

In a backup operation, the software application uses the data processing apparatus 3 to identify data 2 which forms part of the source 4 of data 2 (and/or the primary data storage medium). In an embodiment, the software application 10 cooperates and interacts with the first input/output logic stack 6 of the data processing apparatus 3 (in an embodiment the first input/output logic stack 6 is part of the software application 10 or part of an operating system on the data processing apparatus 3 or data communication apparatus 22). Thus, the software application 10 is able to identify data 2 which forms part of the source 4 of data 2, which may be in the form of one or more data sets 1 or partial data sets, and initiate (and/or control) the movement of the identified data 2 to and from the data processing apparatus 3 to the data communication apparatus 22. In an embodiment, this movement involves data 2 being passed by the first input/output logic stack 6.

Figure 11:
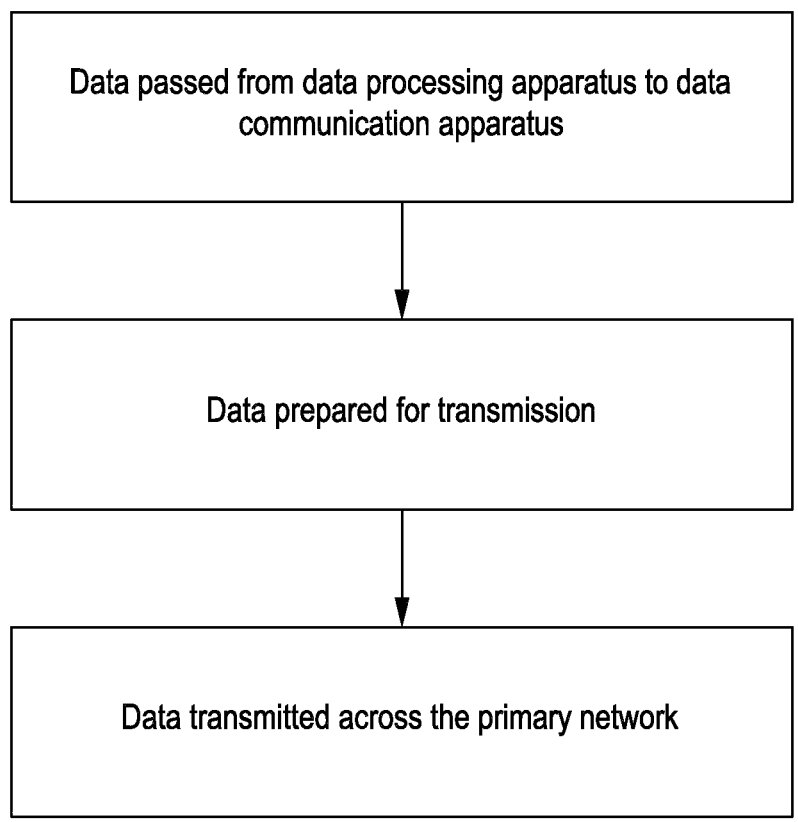
FIG. 11 shows a flow chart of a method according to an embodiment.
Figure 12:
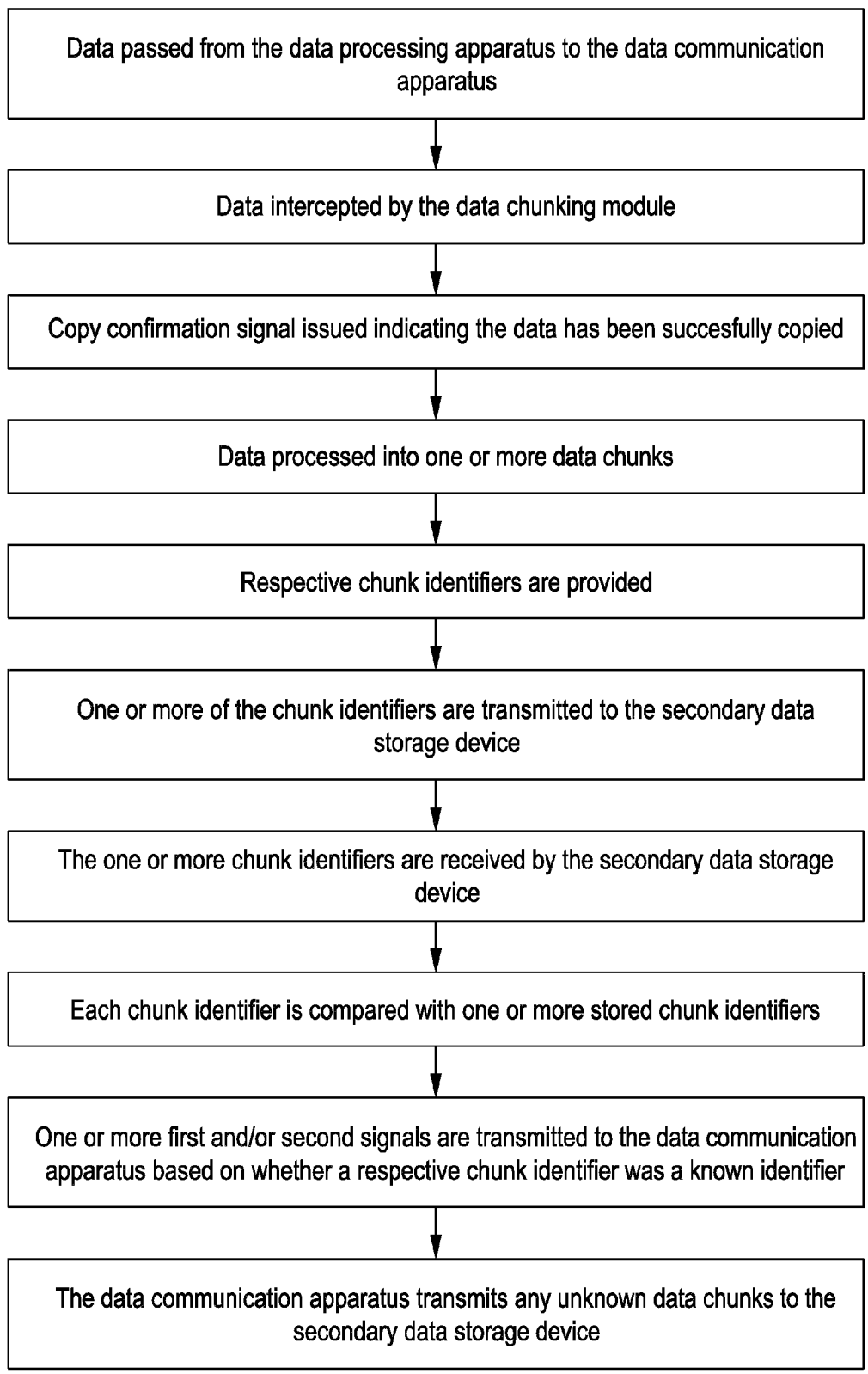
FIG. 12 shows a flow chart of a method according to an embodiment.

The data communication apparatus 22 is operable to transmit the data 2 which has been passed to it from the data processing apparatus 3 to the secondary data storage device 5. The data communication apparatus 22 can transmit the data 2 by two different methods: in a first backup method (see FIG. 11) the data 2 is transmitted across the primary network 32 and in a second backup method (see FIG. 12) the data 2 is transmitted as one or more data chunks 17 across the secondary network 33. The software application 10 is, in an embodiment, unaware of which of the two backup methods is utilized.

A third backup method is available in an embodiment of the invention and will be described below in more detail.

In accordance with an embodiment of the first backup method (see FIG. 11), the data 2 is passed to the data communication apparatus 22 from the data processing apparatus 3; this may be initiated and/or controlled by the software application 10. The data 2 is then just prepared for transmission across the first network 32. In an embodiment, the data 2 is processed by the second input/output logic stack 11 but the data chunking module 16 does not intercept the data 22 as it is processed through the input/output stack 11. All of the data 2 is transmitted to the secondary data storage device 5 over the first communication network 32. In an embodiment, the secondary data storage device 5 is operable to process the data 2 into one or more data chunks 17 using the data chunking module of the secondary data storage device 5 (as discussed above). In an embodiment, a confirmation signal is issued when the data 2 has been successfully transmitted.

In accordance with an embodiment of the second backup method (see FIG. 12), the data 2 is passed to the data communication apparatus 22 from the data processing apparatus 3; this may be initiated and/or controlled by the software application 10. The data 2 is processed through the data communication apparatus 22 (in an embodiment, the data 2 is processed by the second input/output logic stack 11) but the chunking module 16 of the data communication apparatus 22 intercepts the data 2 and prevents its communication across the primary network 32. Instead, the data 2 is processed into one or more data chunks 17 and respective chunk identifiers 25 are produced. In an embodiment, the data chunking module 16 processes the data 2 into two or more data chunks 17 and two or more respective chunk identifiers 25 are produced. In an embodiment, the chunk identifier or identifiers 25 are generated using the chunk identifier generation module 16.

In accordance with an embodiment of the second method, the resultant data chunk or chunks (and the respective chunk identifier or identifiers 25) are stored in the spool or buffer 21 (as described above). In accordance with an embodiment, the or each chunk identifier 25 is transmitted across the secondary network 33 to the secondary data storage device 5 without delay or substantially without delay (as discussed above). Transmission across the secondary network 33 may utilize the host bus adapter 14 of the second input/output logic stack 11.

The data chunking module 16 may issue or cause the issuance of a confirmation signal to the software application 10 indicating that the data 2 has been successfully transmitted to the secondary storage device 5—notwithstanding that at least part of the data 2 (in the form of one or more data chunks 17) may still not have been transmitted to the secondary storage device 5. The software application 10 is able to continue with its normal operation on the basis that the data 2 has been successfully transmitted to the secondary storage device 5. In other words, the software application 10 is, in an embodiment, blind to the processes which occur in the data communication apparatus 22 concerning the second backup method of transmitting data 2 to the secondary data storage device 5. As such, the software application 10 may only be aware of the first backup method of transmission and the second backup method of transmission can be carried out without a need to alter the software application 10 to take into account the differences between the first and second backup methods.

In an embodiment, a confirmation signal is transmitted to the software application 10 upon processing the data into one or more data chunks 17. The confirmation signal may be transmitted when the data has been received by the data chunking module 16, or when the data 2 has been processed into one or more data chunks 17, or the one or more data chunks 17 have been stored in the buffer or spool 21. In an embodiment, issuance of a confirmation signal is initiated by the data chunking module 16 but carried out by another module; in an embodiment, the other module is a module which receives and transmits commands to and from the software application 10. In an embodiment, the issuance of a confirmation signal is initiated when a copy instruction is partially processed. In an embodiment, the issuance of a confirmation signal is initiated independently of whether or not the instructed copying/transmission of data has been completed.

In an embodiment, a confirmation signal is transmitted to the software application upon receipt of an instruction to copy data to the secondary storage device 5. In an embodiment, issuance of a confirmation signal is initiated upon receipt of an instruction to copy data to the secondary storage device 5.

When the or each chunk identifier 25 is received by the secondary storage device 5 (through the secondary network 33), the chunk identifier or identifiers 25 are passed to the comparison module 24 of the secondary storage device 5. The comparison module 24 compares the or each chunk identifier 25 which was received from the data communication apparatus 22 with any chunk identifiers 25 which are included in the record 23 of the secondary storage medium 5.

As the record 23 of the secondary storage medium includes the chunk identifier or identifiers 25 of the or each of the data chunks 17 which are stored on the secondary storage device 5 and each chunk identifier 25 represents the content of a data chunk 17, the comparison module 24 is able to determine whether or not the data chunk 17 to which the received chunk identifier 25 relates is already stored on the secondary storage device 5. If a chunk identifier 25 which is transmitted to the secondary data storage device 5 from the data communication apparatus 22 matches or substantially matches a chunk identifier 25 which is maintained in the record 23, then the chunk identifier 25 and the data chunk 17 with which it is associated (and using which it was generated) comprise a known chunk identifier and a known data chunk.

Similarly, if a chunk identifier 25 which is transmitted to the secondary data storage device 5 from the data communication apparatus 22 does not match or substantially match a chunk identifier 25 which is maintained in the record 23, then the chunk identifier 25 and the data chunk 17 with which it is associated (and using which it was generated) comprise an unknown chunk identifier and an unknown data chunk.

If the chunk identifier 25 is a known identifier, then the comparison module 24 of the secondary data storage device 5 may output a first signal which is, in an embodiment, transmitted to the data communication apparatus 22 through the secondary network 33. If the chunk identifier 25 is an unknown identifier, then the comparison module 24 of the secondary data storage device 5 may output a second signal which is, in an embodiment, transmitted to the data communication apparatus 22 through the secondary network 33.

In an embodiment, the first and second signals may include the chunk identifier 25 to which they relate.

In an embodiment, the second signal is a signal to transmit the unknown data chunk 17 associated with that particular unknown chunk identifier 25 to the secondary data storage device 5 from the data communication apparatus 22. In an embodiment, the first signal is a signal to delete and/or not transmit the known data chunk 17 associated with that particular known chunk identifier 25 from the data communication apparatus 22. In an embodiment, the first and second signals are queued in a spool or buffer 31 of the secondary data storage device 5 until a threshold has been reached.

The threshold may be a time period. The threshold may be a predefined number of chunk identifiers 25. The threshold may be determined by the combined size of the data chunks 17 which are stored in the buffer or spool 31 or the remaining free space in the buffer or spool 31. The threshold may be determined by a decrease in traffic on the secondary network. The threshold may be determined by the time of day, the day of the week, and/or the week of the month. The threshold may be set by the secondary data storage device 5 and may form part of the first signal. A number of threshold may be set and the above operation performed when the first of these thresholds is reached.

Upon receipt of the first and second signals from the secondary data storage device 5, the data communication apparatus 22 may transmit any unknown data chunks 17 to the secondary data storage device 5. The data communication apparatus 22 may wait for a threshold to be reached before transmission.

The threshold may be a time period. The threshold may be a predefined number of unknown data chunks 17. The threshold may be determined by the combined size of the unknown data chunks 17 or the amount of free space available. The threshold may be determined by a decrease in traffic on the secondary network 33. The threshold may be determined by the time of day, the day of the week, and/or the week of the month. The threshold may be set by the secondary data storage device 5 and may form part of a first signal. A number of threshold may be set and the above operation performed when the first of these thresholds is reached.

When a first signal is received, the data communication apparatus 22 may, in an embodiment, delete the known data chunk 17 from the spool or buffer 21 of the data communication apparatus 22.

If a data chunk 17 is a known data chunk 17, then the data chunk need not be transmitted to the secondary data storage device 5. However, in an embodiment, the known chunk identifier 25 for that data chunk is transmitted to the secondary data storage device 5. This transmission may be utilized to provide sufficient information to the secondary data storage device 5 regarding the order of the data chunks 17 which form part of the data 2 being transmitted to the secondary data storage device 5 as part of the backup operation. In other words, this information may be utilized to form a data set record 29 or part thereof. In an embodiment, the data set record 19 is formed (or partially formed) when the chunk identifiers 25 are initially sent to the secondary data storage device 5 for comparison to the chunk identifiers 25 of the data chunks 17 which are already stored on the secondary data storage device 5.

Thus, only those data chunks 17 which are not already stored on the secondary data storage device 5 are transmitted across the secondary network 33. This can constitute a significant reduction in network traffic as the chunk identifiers 25 are generally smaller than the data chunks 17 themselves and if the backup operation includes data chunks 17 which are known data chunks 17, then it is not necessary to transmit those data chunks 17 to the secondary data storage device 5.

The data communication apparatus 22 may be operable to determine whether to use the first backup method or the second backup method dependent on a predetermined factor or factors. The factor or factors may include: the existence of the primary 32 and secondary 33 networks, the capacity of the primary 32 and secondary 33 networks, the level of usage of the primary 32 and secondary 33 networks, the time period since that last backup operation, the amount of data 2 or number of data chunks 17 stored on the secondary data storage device 5, and a user preference.

In an embodiment, the comparison module 24 may assume that partially matching chunk identifiers 25 are the same as matching chunk identifiers 25. For example, only the most significant bits of a chunk identifier 25 may match. If the probability of two chunk identifiers 25 for different data chunks 17 having the same most significant bits (or otherwise being a partial match), then it is possible to avoid comparison of the entire of the two chunk identifiers 25 in order to find a match to a reasonable degree of certainty.

Accordingly to the third backup method, the software application 10 makes a call to a library of the data processing apparatus 3 or data communication apparatus 22 in order to determine whether the third backup method is to be utilized and, if so, to determine a predetermined parameter. The predetermined parameter, which may be set by a system administrator, provides a condition which should be met by operation of the backup method. For example, the predetermined parameter may be that no more than 2% of the data 2 in the source 4 of data 2 should be only stored locally. The software application 10 is operable to compare this predetermined parameter with the current system status to determine whether not the condition (as set by the predetermined parameter) has been met. If the condition has not been met, then data 2 may be transferred utilizing the first or second backup method described above. In an embodiment, this method may require a restore operation in order to meet the condition. In an embodiment, a user (such as a system administrator) is prompted to enter the predetermined parameter during operation of the third backup method.

In an embodiment of the invention, the software application 10 may issue a command to the data communication apparatus 22 which instructs the data communication apparatus 22 to transmit all data 2 which is currently stored therein (for example, in the spool or buffer 21 as one or more data chunks 17) to the secondary data storage device 5. The data communication apparatus 22 may then transmit all of the data 2 which is currently stored therein to the secondary data storage device 5 (across the primary 32 or secondary 33 networks or a combination of both). This operation may occur irrespective of the above described backup method in which chunk identifiers 25 are utilized to ensure that known data chunks 17 are not copied to the secondary data storage device 5. Thus, the software application can, in an embodiment, cause the data communication apparatus 22 to be "flushed" of data 2 waiting to be transmitted to the secondary data storage device 5.

Restore Operation

Similarly, in an embodiment, the software application 10 is operable to initiate and/or control the movement of data 2 from the secondary data storage device 5 to the source 4 of data 2 (and/or the primary data storage medium). In an embodiment, this movement of data 2 forms part of restore operation.

In an embodiment, a restore operation is initiated and/or controlled by the software application 10 and, as part of the restore operation, the software application 10 requests data 2 from the secondary data storage device 5.

Figure 13:
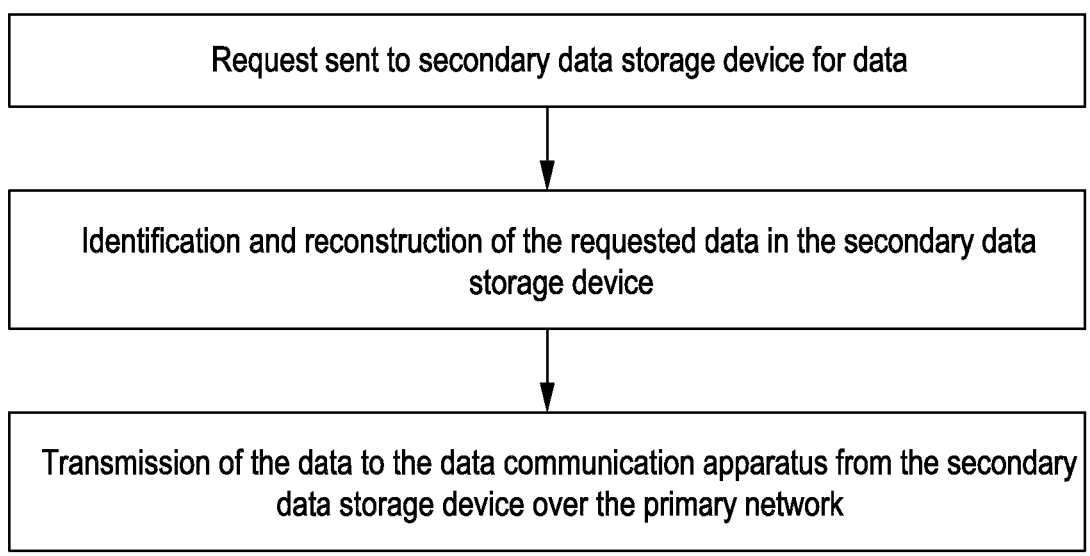
FIG. 13 shows a flow chart of a method according to an embodiment.

The request may be sent to the secondary data storage device 5 over the primary network 32. The secondary data storage device 5, upon receipt of the request, will identify the requested data 2 in the data set record 29 of the secondary data storage device 5. The data set record 29 includes information concerning the identity of one or more data chunks 17 which form the requested data 2 and their location on the secondary data storage device 5. Thus, the secondary data storage device 5 is operable to reconstruct the data 2 by ordering the specified data chunks 17 (or copies thereof) in the specified order. The data 2 may then, in an embodiment, be transmitted across the primary network to the data communication apparatus (a first restore method— see FIG. 13).

Figure 14:
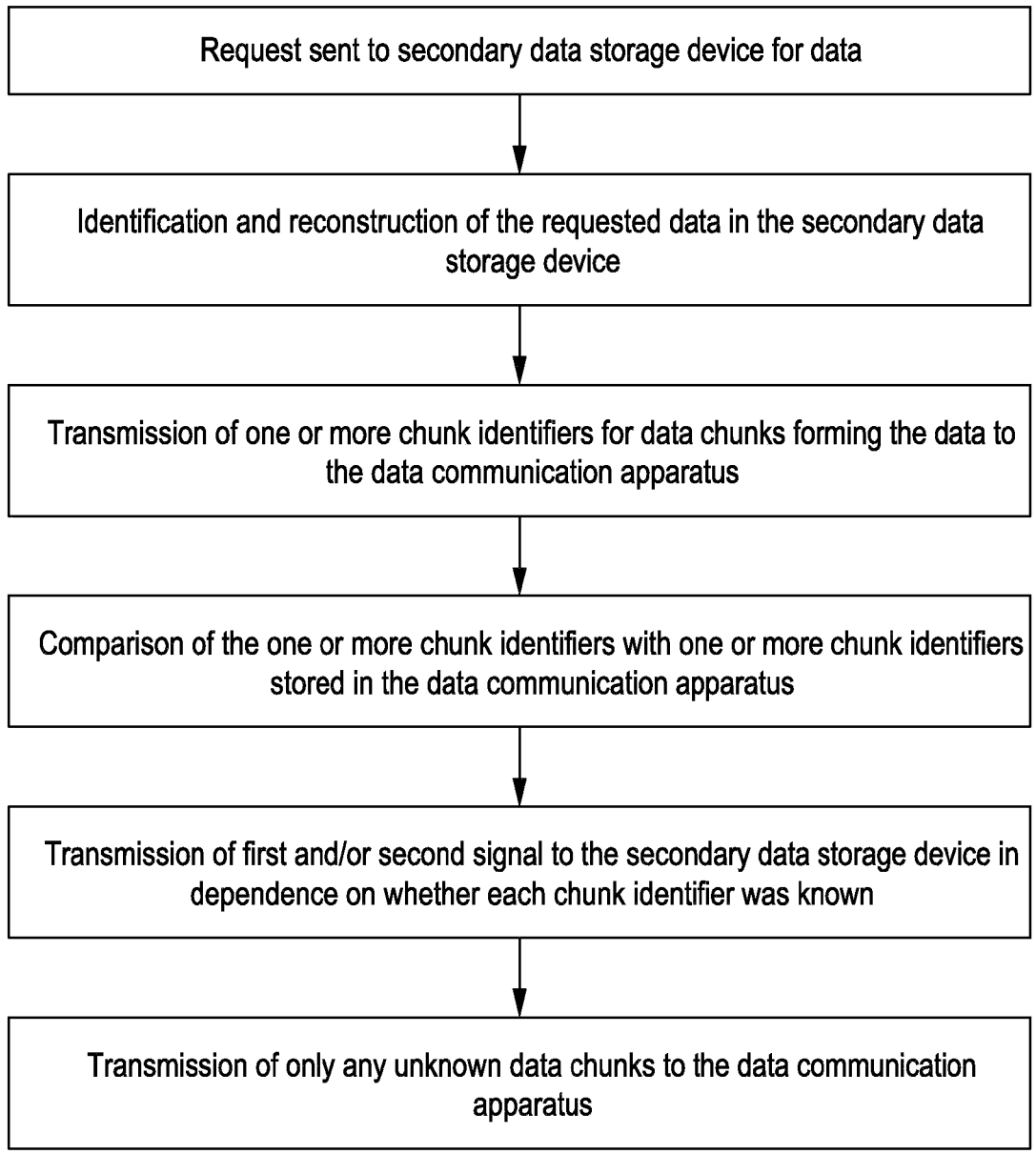
FIG. 14 shows a flow chart of a method according to an embodiment.

If a second restore method (see FIG. 14) is utilized, then the secondary data storage device 5 prepares a list of the chunk identifier or identifiers 25 of the or each data chunk 17 which forms the requested data. The or each chunk identifier 25 is transmitted to the data communication apparatus 22 across the secondary network 33 (this may be done in substantially the same manner as the data communication apparatus 22 sending chunk identifiers 25 to the secondary data storage medium 5 as part of a backup procedure). The data processing apparatus 22 is operable to search the buffer or spool 21 to determine whether or not the chunk identifier 25 is a known chunk identifier 25 (and, hence, whether or not the associated data chunk 17 is a known data chunk 17). If the chunk identifier 25 is a known identifier 25, then the data communication apparatus 22 does not require a copy of the associated data chunk 17 from the secondary data storage device 5 because it already has a copy of the data chunk 17. Thus, the data communication apparatus 22 may transmit a first signal (across the secondary network) to the secondary data storage device 5. In response to the first signal, the secondary data storage device 5 will not transmit the associated data chunk 17 to the data communication apparatus 22. If the chunk identifier 25 is an unknown chunk identifier 25, then the data communication apparatus 22 will transmit a second signal to the secondary data storage device 5. The transmission of the first and second signals may be delayed until a threshold is reached (in the same manner as the signals are delayed in the backup operation).

Upon receipt of the second signal, the secondary data storage device 5 will transmit the associated data chunk 17 to the data communication apparatus 22 across the secondary network 33; in an embodiment, the transmission of the associated data chunk 17 may be delayed until a threshold is reached (in the same manner as in the backup operation).

In an embodiment, as part of the second restore method, the secondary data storage device 5 is operable to transmit at least part of the data set record 29 to the data communication apparatus 22, so that the data communication apparatus 22 can reconstruct the requested data 2. In an embodiment, the secondary data storage device 5 transmits the unknown data chunks 17 in logical order with known chunk identifiers 25 for this purpose.

Once the requested data has been received by the data communication apparatus 22 it may be passed the data processing apparatus 3 where it may be copied to the source 4 of data 2 (and/or the primary data storage device).

When the data has been successfully received by the data communication apparatus 22 a confirmation signal may be transmitted to the software application 10; when the data has been successfully received by the source 4 of data 2 (and/or the primary data storage medium) a confirmation signal may be transmitted to the software application 10.

Upon receipt of a confirmation signal, the software application 10 may issue one or more commands; the one or more commands may include commands for the data 2 which has been transmitted to be deleted from the secondary data storage device 5.

The components of an embodiment of the present invention may be implemented in hardware and/or software.

It will be understood that the primary 15,26 and secondary 18, 27 network connections are examples to interfaces for communication. The first 32 and second 33 networks include communication lines which are connected to other devices or only the devices specified above.

The data processing apparatus 3 and the data communication apparatus 22 may utilize a single processing unit or multiple processing units. The secondary data storage device 5 may include its own processing unit.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A method of transferring data from a primary data storage medium of a first device to a remote secondary data storage device which is remote from the primary data storage medium, the method comprising:
   processing, by the first device, the data into chunks;
   issuing, from the first device, a confirmation signal that the data has been copied to the remote secondary data storage device in response to receiving the data and even though at least some of the chunks have not yet been sent to the remote secondary data storage device;
   sending a first chunk identifier from the first device to the remote secondary data storage device, the first chunk identifier being representative of an identity of a first chunk of the data;
   receiving, at the first device, a transfer instruction from the remote secondary data storage device, the transfer instruction responsive to the remote secondary storage device determining that the first chunk identifier does not at least partially match a stored identifier; and
   transferring the first chunk from the primary data storage medium to the remote secondary data storage device in response to the transfer instruction.

2. A method executed by a communication apparatus having a processor, comprising:
   processing, by a chunking and identifier module in the communication apparatus, data into chunks;
   generating, by the chunking and identifier module, a first chunk identifier representative of an identity of a first of the chunks of data;
   sending, through a first interface in the communication apparatus, the first chunk identifier to a remote storage device;
   sending, through the first interface, the first chunk of data to the remote storage device upon receipt of a transfer instruction from the remote storage device; and
   sending and receiving, through a second interface in the communication apparatus, data to and from the remote storage device independently of the chunking and identifier generation module.

3. The method of claim 2, further comprising receiving the transfer instruction in response to a determination of the remote storage device that the first chunk of data is unknown at the remote storage device.

4. The method of claim 2, wherein the chunking and identifier module generates chunk identifiers for corresponding ones of the chunks, the method further comprising:
   sending, through the first interface, the chunk identifiers without associated chunks to the remote storage device,
   sending, through the first interface, selected ones of the chunks to the remote storage device in response to receiving indications from the remote storage device identifying which of the chunks are unknown at the remote storage device, the indications responsive to the chunk identifiers, and
   declining, by the first interface, to send to the remote storage device remaining ones of the chunks that are known at the remote storage device.

5. The method of claim 2, further comprising:
   selectively using one of a plurality of techniques to communicate with the remote storage device, based on at least one factor,
   wherein a first of the plurality of techniques includes sending particular data to the remote storage device through the second interface without performing chunking on the particular data being sent, and
   wherein a second of the plurality of techniques includes the chunking and identifier generation module processing the particular data into chunks and generating respective chunk identifiers, and sending the chunk identifiers and at least some of the chunks to the remote storage device rather than the particular data.

6. The method of claim 5, wherein the at least one factor is selected from among:
   capacities of first and second networks connected respectively to the first and second interfaces, levels of usage of the first and second networks, time period since last backup operation, and amount of data or chunks stored on the remote storage device.

7. The method of claim 2, further comprising:
   receiving, from the remote storage device, a plurality of chunk identifiers,
   determining whether a chunk corresponding to each of the plurality of chunk identifiers is known to the communication apparatus;
   in response to determining that a particular chunk corresponding to a particular one of the plurality of chunk identifiers is known to the communication apparatus, sending a first indication to the remote storage device to cause the remote storage device not to send the particular chunk to the communication apparatus; and
   in response to determining that the particular chunk corresponding to the particular chunk identifier is unknown to the communication apparatus, sending a second indication to the remote storage device to cause the remote storage device to send the particular chunk to the communication apparatus.

8. The method of claim 7, wherein the particular chunk is determined to be known if a copy of the particular chunk is already in the communication apparatus.

9. The method of claim 7, wherein the receiving of the chunk identifiers and the determining are part of a data restore operation to restore data from the remote storage device.

10. A method of a communication apparatus, comprising:
    receiving, by a module of the communication apparatus, instructions to copy data to a remote storage device;
    a chunking and identifier generation module in the communication apparatus:
       processing the data into chunks,
       generating a first chunk identifier representative of an identity of a first of the chunks of data, and
       upon processing of the data, issuing a confirmation signal to a software application indicating that the data has been copied to the remote storage device even though at least some of the chunks have not yet been sent to the remote storage device;
    sending, by an interface of the communication apparatus, the first chunk identifier to the remote storage device; and
    sending, by the interface, the first chunk of data to the remote storage device upon receipt of a transfer instruction from the remote storage device.

11. The method of claim 10, further comprising sending, by a second interface of the communication apparatus, data to the remote storage device independently of the chunking and identifier generation module.

12. The method of claim 10, further comprising:
    receiving, from the remote storage device, a plurality of chunk identifiers,
    determining whether a chunk corresponding to each of the plurality of chunk identifiers is known to the communication apparatus;
    in response to determining that a particular chunk corresponding to a particular one of the plurality of chunk identifiers is known to the communication apparatus, sending a first indication to the remote storage device to cause the remote storage device not to send the particular chunk to the communication apparatus; and
    in response to determining that the particular chunk corresponding to the particular chunk identifier is unknown to the communication apparatus, sending a second indication to the remote storage device to cause the remote storage device to send the particular chunk to the communication apparatus.

13. The method of claim 12, wherein the particular chunk is determined to be known if a copy of the particular chunk is already in the communication apparatus.

14. The method of claim 10, wherein the transfer instruction is responsive to the remote storage device determining that the first chunk identifier does not match a stored identifier at the remote storage device.

* * * * *